United States Patent
Horning (10) Patent No.: US 6,411,013 B1
(45) Date of Patent: Jun. 25, 2002

(54) MICROACTUATOR ARRAY WITH INTEGRALLY FORMED PACKAGE

(75) Inventor: Robert D. Horning, Savage, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/476,667

(22) Filed: Dec. 30, 1999

(51) Int. Cl.⁷ ............................................... H01L 41/08
(52) U.S. Cl. ...................... 310/330; 310/328; 310/331; 310/800
(58) Field of Search ................................ 310/330, 331, 310/332, 328, 800, 366, 340, 309

(56) References Cited

U.S. PATENT DOCUMENTS

| | | | |
|---|---|---|---|
| 4,135,108 A | * | 1/1979 | Besson .................... 310/369 X |
| 4,234,245 A | * | 11/1980 | Toda et al. .................. 310/800 |
| 4,295,010 A | * | 10/1981 | Murphy ...................... 310/800 |
| 5,350,966 A | * | 9/1994 | Culp .......................... 310/328 |
| 5,517,467 A | * | 5/1996 | Fromont et al. ........ 310/800 X |
| 5,572,076 A | | 11/1996 | Benecke et al. |
| 5,726,509 A | | 3/1998 | Benecke et al. |
| 5,761,782 A | * | 6/1998 | Sager ..................... 310/800 X |
| 6,184,608 B1 | * | 2/2001 | Cabuz et al. ........... 310/800 X |

FOREIGN PATENT DOCUMENTS

| | | |
|---|---|---|
| EP | 0659910 A | 6/1995 |
| WO | 0039914 A | 7/2000 |

* cited by examiner

Primary Examiner—Mark O. Budd
(74) Attorney, Agent, or Firm—Kris T. Fredrick (57) ABSTRACT

A microactuator array with an integrally formed package is disclosed. Because the package is made from the same material and at the same time as the actuator itself, no extra time or cost is associated with packaging. In addition, it is contemplated that the package may be configured to provide all the necessary interconnections and leads for addressing and distributing power to the various layers in the microactuator stack. Thus, no additional steps or cost are associated with electrical interconnection.

32 Claims, 4 Drawing Sheets

MICROACTUATOR ARRAY WITH INTEGRALLY FORMED PACKAGE

CROSS-REFERENCE TO RELATED CO-PENDING APPLICATIONS

This Application is related to U.S. Pat. No. 6,184,608, issued Feb. 6, 2001, to Cabuz et al., and entitled "POLYMER MICROACTUATOR ARRAY WITH MACROSCOPIC FORCE AND DISPLACEMENT", which is incorporated herein by reference.

FIELD OF THE INVENTION

The present invention relates to microactuators having macroscopic force and displacement. More particularly the invention relates to microactuators comprising a 3-D array of small actuator cells, which are formed from stacked polymer sheets with electrodes.

BACKGROUND OF THE INVENTION

Most microactuator arrays, used as MEMS (Micro-Electro-Mechanical-Systems) devices, are fabricated in silicon. Despite the many favorable attributes of silicon, it is not always a suitable or ideal material for every application of MEMS. Silicon is brittle and subject to breaking, particularly as the total device size increases. This brittleness limits devices, especially actuators, to relatively small sizes capable of only small displacements and forces. The shapes that can be realized in silicon are typically restricted by crystalline planes or 2-D fabrication processes, and more complicated structures often result in prohibitively high cost and low yield. It would be of great advantage to the art if another material, other than silicon, could be used for MEMS and actuators.

SUMMARY OF THE INVENTION

The present invention overcomes many of the disadvantages of the prior art by providing a microactuator that is formed primarily from polymer materials, and further includes an integrally formed package. The actuator array may be similar to that described in U.S. Pat. No. 6,184,608, issued Feb. 6, 2001, to Cabuz et al., entitled "POLYMER MICROACTUATOR ARRAY WITH MACROSCOPIC FORCE AND DISPLACEMENT", which is incorporated herein by reference.

Cabuz et al. discloses a polymer based microactuator array that is formed from a plurality of generally parallel thin flexible polymer sheets bonded together in a predetermined pattern to form an array of unit cells on the various layers. Thin layers of conductive films and dielectric materials are deposited on the polymer sheets to form a plurality of electrodes associated with the array of unit cells in a conventional manner. Contact is made between layers through flexible plastic interconnect straps as in a conventional flex-tape connector. These interconnection straps can be metalized plastic or conductive polymer, and may be cut from the same polymer sheet as in the stack layers. Layers can be electrically tied together or individually addressed, depending on the degree of control and sophistication of the end use, noting that individual addressing requires more connections so it would involve higher cost but finer control when needed.

The top of the microactuator stack of Cabuz et al. is secured to a top housing and the bottom of the microactuator stack is secured to a bottom housing. The top and/or bottom housings may include an external connector and control circuitry for controlling the microactuator. The top and/or bottom housing may further include one or more levels of metal interconnects, as in a printed circuit board, to route the inputs of the external connector through the control circuitry, and to the sheets of the actuator using one or more of the flexible interconnect straps.

Electrostatic actuators are often susceptible to degradation from various environmental conditions. Corrosion, dust, humidity and even air currents can reduce the reliability and/or performance of the actuator. To protect the microactuator stack from certain environmental conditions, Cabuz et al. provides a flexible protective film around the microactuator stack. This ends of the protective film are attached to the top and bottom housings, respectively. A limitation of the protective film of Cabuz et al. is that it can be difficult to attach the ends of the protective film to the top and bottom housings. Another limitation of Cabuz et al. is that connecting the flexible interconnect straps that are used to interconnect the various polymer sheets of the stack to one another and to the housing can be difficult.

The present invention overcomes many of the limitations of Cabuz et al. by providing a microactuator array with an integrally formed package. The integrally formed package provides protection to the microactuator stack, while requiring fewer assembly steps than the protective film approach of Cabuz et al. In addition, the integrally formed package of the present invention may provide all the necessary interconnections and leads for addressing and distributing power to the various layers in the microactuator stack.

In a first illustrative embodiment of the present invention, a plurality of generally parallel thin flexible polymer sheets are bonded together in a predetermined pattern to form an array of unit cells. A protective package is provided around the microactuator stack, and is mechanically coupled to selected sheets in the stack using one or more bridges.

The protective package may be formed at the same time as the sheets of the microactuator stack. That is, and in one illustrative embodiment, each sheet of the microactuator stack includes an electrode region and a frame region, with the frame region extending around and spaced from the outer perimeter of the electrode region. When stacked, the frame regions form the protective package around the microactuator stack.

To connect the frame region to the electrode region, one or more bridges are provided on selected sheet. The bridges preferably extend between the electrode region and the frame region to form a mechanical connection therebetween. In a preferred embodiment, the frame region, the bridge regions, and the electrode region are cut from the same polymer sheet. During assembly, the electrode regions are bonded together in a predetermined pattern to form an array of unit cells. At the same time, the frame regions are bonded together to form a protective package around the microactuator stack. As such, the protective package may be formed at the same time, and integrally with, the microactuator stack.

The frame region may include one or more contacts and/or vias for providing an electrical connection between adjacent polymer sheets. Conducting traces may also be provided for electrically connecting the contacts and/or vias to selected electrodes in the microactuator stack. The conducting traces preferably are located in the frame region, and extend across one or more of the bridges to a desired electrode in the microactuator stack. By properly positioning the contacts, vias and conducting traces, the stacked frame regions can provide all the necessary interconnections and leads required for addressing and distributing power to any of the layers in the microactuator stack.

The top of the microactuator stack and the top of the protective package are preferably secured to a top housing, and the bottom of the microactuator stack and the bottom of the protective package are preferably secured to a bottom housing. Like Cabuz et al., the top and/or bottom housing may include an external connector and control circuitry for controlling the microactuator. The top and/or bottom housing may also include one or more levels of metal interconnects, as in a printed circuit board, to route the inputs of the external connector through the control circuitry, and to selected locations on the protective package. As indicated above, the protective package of the present invention may distribute the control signals to any layer in the microactuator stack.

In one illustrative embodiment, the frame regions are bonded together to form a billows type package configuration that can expand and retract with the movement of the microactuator stack. This can be achieved by, for example, providing a first bonding region along a first major surface (e.g., top surface) of the each frame region, and a second bonding region along a second major surface (e.g., bottom surface) of each frame region.

For odd layers, for example, the first bonding region may be positioned closer to the outer perimeter of the frame region than the inner perimeter, and the second bonding region may be positioned closer to the inner perimeter of the frame region than the outer perimeter. For even layers, the first bonding region may be positioned closer to the inner perimeter of the frame region than the output perimeter, and the second bonding region may be positioned closer to the outer perimeter of the frame region than the inner perimeter. As such, each of the bonding regions may be align with the bonding regions of adjacent sheets, and the frame regions, when stacked and bonded, may form a billows type package configuration that can expand and retract with the movement of the microactuator stack.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

The actuator array of the present invention may be similar to that described in U.S. Pat. No. 6,184,608, issued Feb. 6, 2001, to Cabuz et al., entitled "POLYMER MICROACTUATOR ARRAY WITH MACROSCOPIC FORCE AND DISPLACEMENT", which is incorporated herein by reference. Cabuz et al. discloses a polymer based microactuator array that is formed from a plurality of generally parallel thin flexible polymer sheets bonded together in a predetermined pattern to form an array of unit cells on the various layers.

Figure 1:
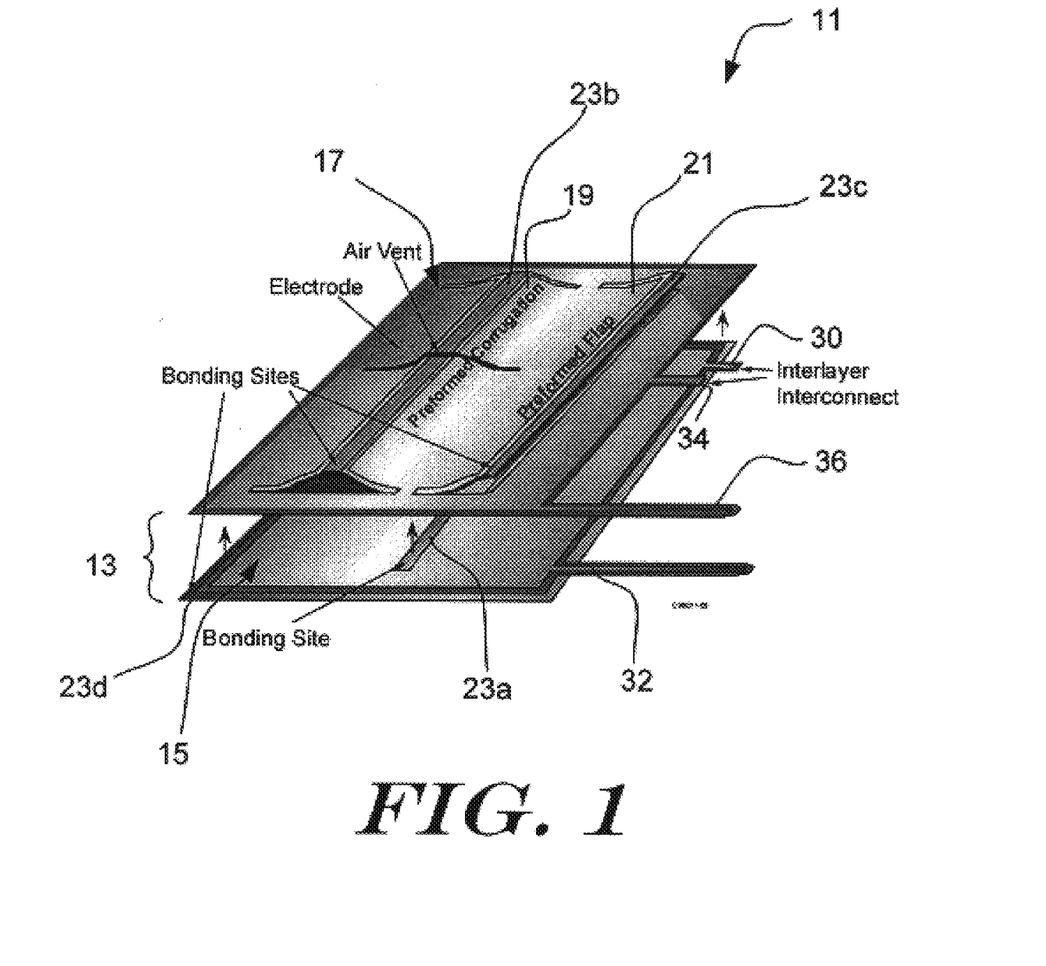
FIG. 1 is a perspective view of two adjacent polymer sheets with electrodes and flexible plastic interconnect straps.

FIG. 1 is a perspective view of two adjacent polymer sheets that are in accordance with Cabuz et al. The polymer sheets contain circuitry, as in a flexible printed circuit, and are laminated together to form a 3-D array. The array can be actuated to provide relatively large forces >1 N/cm$^2$ and relatively large displacements (~30% strain). The fabrication technology (flex circuit technology) gives this device the potential for very low manufacturing cost.

Construction of the actuator of FIG. 1 begins with polymers formed into thin sheets 13, only two of which are shown including sheets 15 and 19. Alternating sheets 15 may be flat (although this is not required), which under some circumstances may result in larger forces between layers. Alternating sheets 13 may be preformed with a specific curvature, such as corrugations 19 or flaps 21, or left flat to be curved by the applied load during use, depending upon design considerations and the final use of the microactuator array being contemplated.

The various sheets 13 are bonded together at specific points, such as points 23a, 23b, 23c and 23d, to form an array of unit cells. Each unit cell produces a small force and small displacement. The total force is the sum of the forces from all unit cells on the sheet. When sheets of unit cells are stacked, as shown in FIG. 2, the total displacement is the sum of the displacements of each layer in the stack.

Each of the polymeric sheets 13 includes thin metal films on the front and back surfaces to function as electrodes. As noted above, actuation is accomplished electrostatically. Each layer is biased relative to the adjacent layers, so that relatively strong electric fields (and forces) are present, particularly near the point where the layers are in or near contact. These forces pull the sheets together. Since sufficient forces are typically generated only in the small gap regions between layers, the force does not change significantly as a function of displacement. By nature, the electrostatic force between the sheets is attractive rather than repulsive. Thus, the actuator pulls but does not push. Bi-directional actuation is achieved by using two actuators working opposite each other.

Contact is made between layers through flexible plastic interconnect straps as in a conventional flex-tape connector. Referring to FIG. 1, layer 15 is shown having flexible plastic interconnect straps 30 and 32, and layer 17 is shown having flexible interconnect straps 34 and 36. The flexible interconnect straps may be a metalized plastic or a conductive polymer, and may be cut from the same polymer sheet as the stack layers 15 and 17. Shorter straps, such as straps 30 and 34, may be used to provide interconnection between layers that are relatively closely spaced. Longer straps, such as straps 32 and 36, may be used to provide interconnection between layers located further apart, or between selected layers and the housing.

Figure 2:
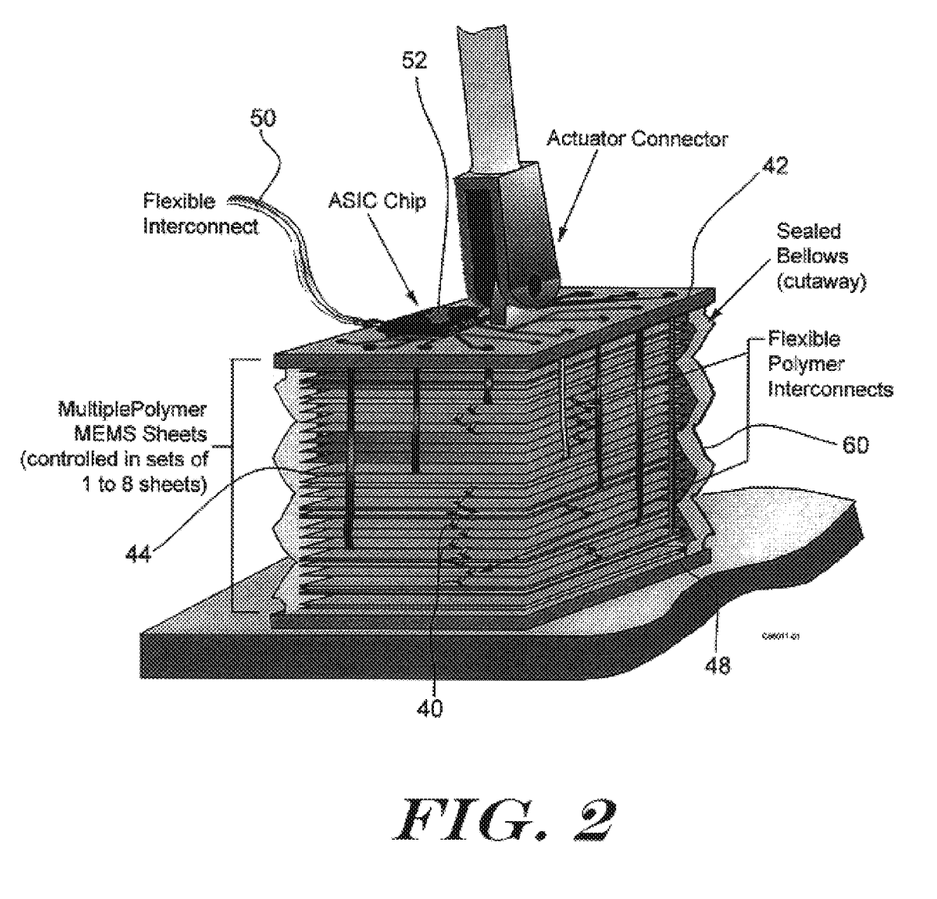
FIG. 2 is a partial cut-away perspective view of a microactuator using the polymer sheets of FIG. 1.

FIG. 2 is a partial cut-away perspective view of a microactuator using the polymer sheets of FIG. 1. Multiple polymer sheets are stacked and bonded as described above to form the microactuator array. Electrodes from selected sheets can be electrically tied together or can be individually addressed, depending on the degree of control and sophistication of the end use, noting that individual addressing requires more connections so it would involve higher cost but finer control when needed. In the diagram shown, several sheets are electrically tied together using short interconnect straps, as shown at 40. As such, these sheets may operate together. Each group of sheets are shown electrically connected to the housing 42 using a longer interconnect strap, as shown at 44. Each group of sheets may thus be individually addressed, if desired. A limitation of this approach is that connecting the flexible interconnect straps to other layers or to the housing can be a difficult and tedious process.

The top of the microactuator stack is secured to a top housing 42 and the bottom of the microactuator stack is secured to a bottom housing 48. The top and/or bottom housings 42 and 48 may include an external connector 50 and control circuitry 52 for controlling the microactuator. The top and/or bottom housing 42 and 48 may further include one or more levels of metal interconnects, as in a printed circuit board, to route the inputs of the external connector 50 through the control circuitry 52, and to the sheets of the actuator using one or more of the flexible interconnect straps.

Because certain environmental conditions can degrade the performance of the actuator, a flexible protective film 60 is placed around the microactuator stack. The ends of the protective film 60 are attached to the top housing 42 and the bottom housing 48, respectively. A limitation of using such an approach is that it can be difficult and time consuming to attach the ends of the protective film 60 to the top housing 42 and the bottom housing 48. Another limitation is that the flexible protective film 60 may be incapable of sealing in a vacuum or other specified gas without collapsing on the microactuator stack.

Figure 3:
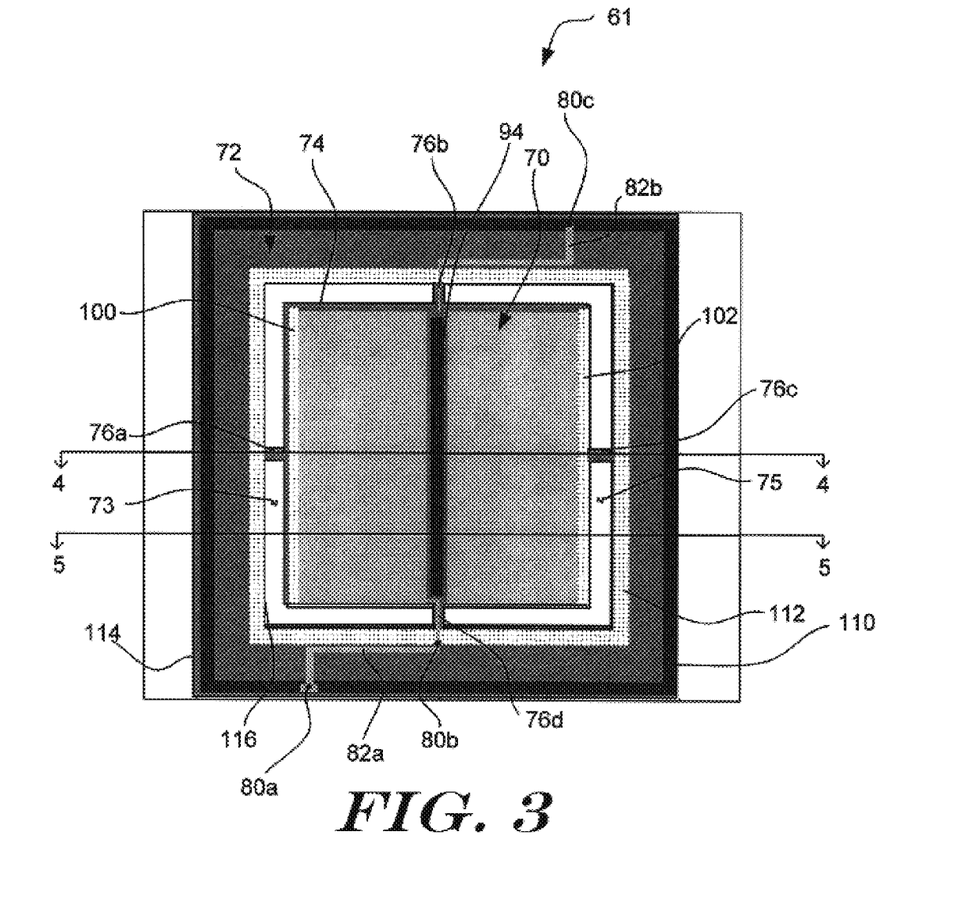
FIG. 3 is a top view of an illustrative polymer sheet in accordance with the present invention.

FIG. 3 is a top view of an illustrative polymer sheet 61 in accordance with the present invention. The present invention overcomes many of the limitations of Cabuz et al. by providing a microactuator array with an integrally formed package. The integrally formed package provides protection to the microactuator stack and requires fewer assembly steps than the protective film approach of Cabuz et al. In addition, the integrally formed package may provide all the necessary interconnections and leads for addressing and distributing power to the various layers in the microactuator stack.

The integrally formed package of the present invention may be formed at the same time as the microactuator stack. That is, and in one illustrative embodiment, each sheet of the microactuator stack includes an electrode region 70 and a frame region 72, with the frame region extending around and spaced from the outer perimeter 74 of the electrode region 70. When the sheets are stacked, the frame regions 72 form the protective package around the microactuator stack.

To connect the frame region 72 to the electrode region 70, one or more bridges 76a, 76b, 76c, and 76d are preferably provided. The bridges 76a, 76b, 76c and 76d extend between the electrode region 70 and the frame region 72 and form a mechanical connection therebetween. The frame region 72, the bridges 76, and the electrode region 70 may be cut from the same polymer sheet.

During assembly, the electrode regions 70 of adjacent sheets are bonded together in a predetermined pattern to form an array of unit cells. At the same time, the frame regions 72 of adjacent sheets are bonded together to form a protective package around the microactuator stack. As such, the protective package may be formed at the same time, and integrally with, the microactuator stack.

The frame region 72 may include one or more contacts and/or vias 80a, 80b and 80c for providing an electrical connection between adjacent polymer sheets. The contacts may be used for making connections between adjacent sheets, and the vias may be used to provide a connection through a sheet. Conducting traces, such as conducting traces 82a and 82b, may also be provided for electrically connecting the contacts and/or vias 80a, 80b, and 80c to selected electrodes in the microactuator stack.

The illustrative electrode region 70 includes a first electrode 90 and a second electrode 92, separate by an isolation region 94. The conducting traces extend from the frame region 72, across one or more of the bridges 76a, 76b, 76c and 76d, and to a desired electrode in the microactuator stack. In the example shown, conducting trace 82a extends from contact 80a to via 80b, across bridge 76, and to electrode 90. Likewise, conducting trace 82b extends from contact 80c, across bridge 76b, and to electrode 92.

The individual layers are preferably designed so that contacts and/or vias 80a, 80b and 80c are substantially aligned with the contacts and/or vias of an adjacent sheet for interlayer connections. As such, electrical contact to the bottom layer in the stack can be made through a series of contacts and/or vias that extend from the top of the stack. Thus, by properly positioning the contacts, vias and conducting traces, all of the necessary interconnections and leads required for addressing and distributing power to any layer in the microactuator stack can be achieved.

Like above, the top of the microactuator stack and the top of the protective package are secured to a top housing, and the bottom of the microactuator stack and the bottom of the protective package are secured to a bottom housing. Like Cabuz et al., the top and/or bottom housing may include an external connector and control circuitry for controlling the microactuator. The top and/or bottom housing may also include one or more levels of metal interconnects, as in a printed circuit board, to route the inputs of the external connector through the control circuitry, and to the protective package.

The individual sheets may be preformed using low cost processes such as cutting or stamping rather than photolithography and etching. Aluminum or other metal or alloy electrodes and one or more dielectric films, such as aluminum oxide or poly-para-xylene, or other suitable organic or inorganic dielectrics, may be deposited on both sides of each sheet as described above. The conductive portion forms the electrode and the dielectric prevents shorting of the electrodes when they touch. These films can be patterned using standard patterning techniques, such as those used to make printed circuit boards. The top dielectric layer should produce a chemically stable surface with a very low surface energy. This is also helpful in controlling stiction. The level of performance that can be obtained from an electrostatic actuator depends on the dielectric strength of the material used as a dielectric.

During assembly, the electrode regions 70 of adjacent layers are bonded together in a predetermined pattern to form an array of unit cells. To do so, one or more bonding regions are defined in the electrode region. In the embodiment shown, a bonding region extends down the center of the electrode region 70, and substantially overlaps the isolation region 94. The bonding region bonds the central axis of the electrode region 70 to the central axis of an adjacent electrode. Likewise, alternating layer in the stack may have the outer edge 100 of electrode 90 and the outer edge 102 of electrode 92 bonded to the outer edges of adjacent electrode regions. Preferably, electrodes 90 and 92 are preformed with a specific curvature, such as corrugations or flaps, or left flat to be curved by the applied load during use, depending upon design considerations and the final use of the microactuator array being contemplated.

The frame regions are bonded together at the same time the electrode regions are bonded to form a protective package around the microactuator stack. In one embodiment, the frame regions 72 are bonded together to form a billows type package configuration that can expand and retract with the movement of the microactuator stack. This can be achieved by, for example, providing a first bonding region 110 along a first major surface (e.g., top surface) of the each frame region, and a second bonding region 112 along a second major surface (e.g., bottom surface) of each frame region.

For odd layers, for example, the first bonding region 110 may be positioned closer to the outer perimeter 114 of the frame region 72 than the inner perimeter 116, and the second bonding region 112 may be positioned closer to the inner perimeter 116 of the frame region 72 than the outer perimeter 114. For even layers, the first bonding region may be positioned closer to the inner perimeter 116 of the frame region 72 than the output perimeter 114, and the second bonding region 112 may be positioned closer to the outer perimeter 114 of the frame region 72 than the inner perimeter 116. As such, each of the bonding regions may be align with the bonding regions of adjacent sheets, and the frame regions, when stacked and bonded, form a billows type package configuration that can expand and retract with the movement of the microactuator stack. The contacts and or vias 80a, 80b and 80c are preferably located in either the first bonding region or the second bonding region or both in order to make interlayer connections. Heat is effective in bonding the sheets together, as would be an adhesive, the latter being less preferred because of the increased spacing between layers with a resultant reduction in force.

Figure 4:
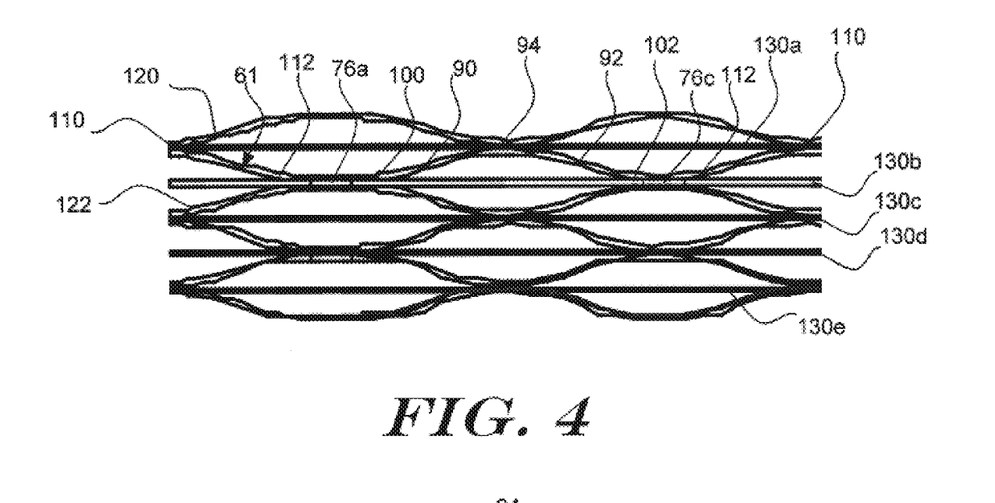
FIG. 4 is a cross-sectional view of an illustrative stack of polymer sheets of FIG. 3, taken along line 4—4.

FIG. 4 is a cross-sectional view of an illustrative stack of polymer sheets of FIG. 3, taken along line 4—4. The sheet 61 of FIG. 3 is shown bonded to several other sheets to form a microactuator array with an integral package. Traveling from left to right along sheet 61, the first bonding region 110, which is on the top surface of the frame region 72, is positioned close to the outer perimeter 114 of the frame region 72. The frame region then extends downward to the second bonding region 112. The second bonding region 112, which is on the bottom surface of the frame region, is positioned close to the inner perimeter 116 of the frame region 72. The second bonding region also extends across bridge 76a, and along the outer edge 100 of electrode 90.

Electrode 90 extends upward to an electrode bonding region, which as described above, substantially overlaps isolation 94. The electrode bonding region is located on the top surface of the electrode, and is bonded to the electrode bonding region on the bottom surface of the adjacent sheet. The electrode 92 extends downward to the second bonding region 112. As indicated above, the second bonding region 112 is positioned close to the inner perimeter 116 of the frame region 72, and in the embodiment shown, extends across bridge 76c, and along the outer edge 102 of electrode 92. The frame region then extends upward to the first bonding region 110 at the right of the Figure. The first bonding 110 is positioned close to the outer perimeter 114 of the frame region 72.

The first bonding region 110 of sheet 61 bonds the top surface of the frame 72 to the bottom surface of the sheet immediately above it. Likewise, the second bonding region 112 bonds the bottom surface of the frame 72 to the top surface of the sheet immediately below it. Accordingly, for odd layers, for example, the first bonding region 110 may be positioned closer to the outer perimeter 114 of the frame region 72 than the inner perimeter 116, and the second bonding region 112 may be positioned closer to the inner perimeter 116 of the frame region 72 than the outer perimeter 114. For even layers, the first bonding region may be positioned closer to the inner perimeter 116 of the frame region 72 than the output perimeter 114, and the second bonding region 112 may be positioned closer to the outer perimeter 114 of the frame region 72 than the inner perimeter 116. In this configuration each of the first and second bonding regions may be align with the bonding regions of adjacent sheets, and the frame regions, when stacked and bonded, form a billows type package configuration that can expand and retract with the movement of the microactuator stack.

Figure 5:
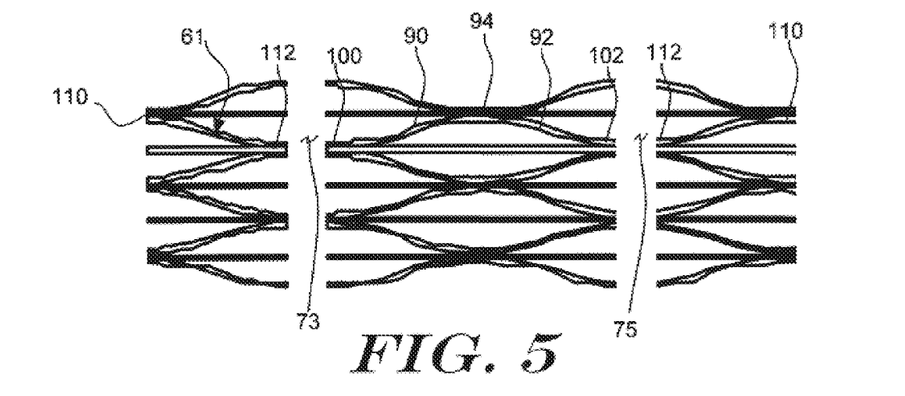
FIG. 5 is a cross-sectional view of an illustrative stack of polymer sheets of FIG. 3, taken along line 5—5.

It is contemplated that alternating sheets 130a, 130b, 130c and 130d in the stack may be flat as shown, which under some circumstances may result in larger forces between layers. However, in a preferred embodiment, the alternating sheets 130a, 130b, 130c and 130d are not provided. FIG. 5 is a cross-sectional view of an illustrative stack of polymer sheets of FIG. 3, taken along line 5—5. This diagram shows the space between the frame region 72 and the electrode region 70. A space along the left of the electrode region 72 is shown at 73, and a space along the right of the electrode region 70 is shown at 75. This space helps mechanically decouple the protective package formed by the stacked framed regions from the microactuator stack. The only mechanical connection between the protective package and the microactuator stack is the bridges, which as described above, can be designed to minimize the mechanical interaction therebetween. In one embodiment, the bridges are made as long as desired, so that the microactuator stack and protective package are able to move relatively independently of one another. Alternatively, or in addition, the bridges may include a zig-zag or other pattern to help mechanically decouple movement of the microactuator from the protective package. As such, the protective package may be sealed throughout, without compromising the flexibility of the microactuator stack.

It is contemplated that the outer surfaces of the protective package may be coated with a thin film of material including, for example, metals, polymers such as parylene, etc. This may help minimize absorption of water and permeability of air through the package.

As will become apparent from the foregoing detailed description, the present invention is admirably suited for various applications, such as portable or airborne systems where weight is critical, or systems operated remotely over a low power bus line. Other operations such as remotely operated ground and water vehicles, robotics, positioning system shutters, valves and pumps are among the devices contemplated for this invention.

Having thus described the preferred embodiments of the present invention, those of skill in the art will readily appreciate that the teachings found herein may be applied to yet other embodiments within the scope of the claims hereto attached.

What is claimed is:

1. A thin sheet for use in a microactuator device, comprising:

an electrode region situated on or in the thin sheet, the electrode region having an outer perimeter and at least one conductive electrode;

a frame region having a first major surface and a second major surface, the frame region extending around and spaced from the outer perimeter of the electrode region;

one or more bridge means for connecting the electrode region to the frame region;
a first bonding region extending along at least a portion of the first major surface of the frame region; and
a second boding region extending along at least a portion of the second major surface of the frame region.

2. A thin sheet according to claim 1, wherein the thin sheet is a thin polymer sheet.

3. A thin sheet according to claim 1, further comprising a third bonding region extending along at least a portion of the electrode region.

4. A thin sheet according to claim 1, wherein the electrode region includes two or more conductive electrodes, and wherein each of the two or more conductive electrodes are electrically isolated from one another.

5. A thin sheet according to claim 4, further comprising a third bonding region extending between two of the electrically isolated electrodes.

6. A thin sheet according to claim 1, wherein the frame region has an outer perimeter and an inner perimeter, the first bonding region extending closer to the outer perimeter than the inner perimeter.

7. A thin sheet according to claim 3, wherein the second bonding region extends closer to the inner perimeter than the outer perimeter.

8. A thin sheet according to claim 7, wherein the first bonding region extends around the entire inner perimeter of the frame region.

9. A thin sheet according to claim 8, wherein the second bonding region extends around the entire inner perimeter of the frame region.

10. A thin sheet according to claim 9, wherein the second bonding region includes at least one of the bridge means, and further includes at least a portion of the electrode region.

11. A thin sheet according to claim 1, wherein the electrode region is preformed into corrugations that extend out of a plane formed by the frame region.

12. A thin sheet according to claim 1, wherein the electrode region is preformed into flaps that extend out of the plane formed by the frame region.

13. A thin sheet according to claim 1, wherein the electrode region is preformed into curved portions that extend out of the plane formed by the frame region.

14. A thin sheet according to claim 1, further comprising one or more electrical contacts positioned on the first major surface of the frame region.

15. A thin sheet according to claim 14, further comprising one or more conducting traces for electrically connecting the one or more electrical contacts to the one or more of the electrodes of the electrode region.

16. A thin sheet according to claim 15, wherein the one or more conducting traces extend across one or more of the bridge means.

17. A thin sheet according to claim 16, wherein the one or more electrical contacts are located in the first bonding region.

18. A thin sheet according to claim 14, further comprising one or more vias that extend through the frame region.

19. A thin sheet according to claim 1, further comprising one or more electrical contacts positioned on the second major surface of the frame region.

20. A thin sheet according to claim 19, further comprising one or more conducting traces for electrically connecting the one or more electrical contacts to one or more of the conductive electrodes of the electrode region.

21. A thin sheet according to claim 20, wherein the one or more conducting traces extend across one or more of the bridge means.

22. A thin sheet according to claim 21, wherein the one or more electrical contacts are located in the second bonding region.

23. A microactuator array device, comprising:
a plurality of generally parallel thin flexible polymer sheets bonded together in a predetermined pattern to form an array of unit cells;
thin conductive and dielectric films deposited on said sheets to form a plurality of electrodes associated with said array of unit cells; and
a protective package surrounding said sheets, said protective package mechanically coupled to selected sheets via one or more bridge means.

24. A device according to claim 23, wherein the protective package comprises a plurality of generally parallel thin flexible polymer sheets that are bonded together to form a frame region, the frame region having an inner perimeter that is spaced from the outer perimeter of the array of unit cells.

25. A device according to claim 24, wherein selected polymer sheets of the frame region include one or more contacts and/or one or more vias for providing an electrical connection between adjacent polymer sheets.

26. A device according to claim 25, further comprising one or more conducting traces for electrically connecting the one or more contacts and/or one or more vias of the frame region to selected electrodes associated with said array of unit cells.

27. A device according to claim 26, wherein the one or more conducting traces extend across one or more of the bridge means.

28. A microactuator device with integral protective package, comprising:
plurality of generally parallel thin flexible polymer sheets bonded together in a predetermined pattern to form an array of unit cells;
selected ones of the polymer sheets including:
an electrode region having an outer perimeter;
a frame region having a first major surface and a second major surface, the frame region extending around and spaced from the outer perimeter of the electrode region; and
one or more bridges for connecting the electrode region to the frame region.

29. A device according to claim 28, wherein the selected polymer sheets further include:
a first bonding region extending along at least a portion of the first major surface of the frame region; and
a second boding region extending along at least a portion of the second major surface of the frame region.

30. A device according to claim 29, wherein the first bonding region and the second bonding region of adjacent polymer sheets are substantially aligned with one another.

31. A device according to claim 29, wherein the frame region of selected polymer sheets include one or more vias for providing an electrical connection through the polymer sheet.

32. A device according to claim 29, wherein the frame region of selected polymer sheets include one or more contacts for providing an electrical connection between polymer sheet.

* * * * *

UNITED STATES PATENT AND TRADEMARK OFFICE
CERTIFICATE OF CORRECTION

PATENT NO. : 6,411,013 B1  Page 1 of 1
DATED : June 25, 2002
INVENTOR(S) : Robert D. Horning It is certified that error appears in the above-identified patent and that said Letters Patent is hereby corrected as shown below:

Column 10,
Line 49, replace "boding" with -- bonding --.

Signed and Sealed this

Twenty-seventh Day of August, 2002

*Attest:*

*Attesting Officer*

JAMES E. ROGAN
*Director of the United States Patent and Trademark Office*